(12) United States Patent
Mann

(10) Patent No.: US 8,997,423 B2
(45) Date of Patent: Apr. 7, 2015

(54) PANEL VENEER SYSTEM WITH CAGE-TYPE EMBEDDED RAIL

(71) Applicant: Matthew Mann, Peterstown, WV (US)

(72) Inventor: Matthew Mann, Peterstown, WV (US)

(73) Assignee: Matthew Mann, Peterstown, WV (US)

(*) Notice: Subject to any disclaimer, the term of this patent is extended or adjusted under 35 U.S.C. 154(b) by 0 days.

(21) Appl. No.: 13/918,017

(22) Filed: Jun. 14, 2013

(65) Prior Publication Data

US 2013/0305646 A1     Nov. 21, 2013

Related U.S. Application Data

(63) Continuation-in-part of application No. 13/179,831, filed on Jul. 11, 2011, now Pat. No. 8,806,826.

(60) Provisional application No. 61/362,740, filed on Jul. 9, 2010, provisional application No. 61/486,850, filed on May 17, 2011.

(51) Int. Cl.
*E04C 2/38* (2006.01)
*E04F 13/08* (2006.01)
*E04C 3/04* (2006.01)

(52) U.S. Cl.
CPC ............... *E04C 2/38* (2013.01); *E04F 13/0873* (2013.01); *E04F 13/0805* (2013.01); *E04F 13/0816* (2013.01); *E04C 2003/0434* (2013.01); *E04F 2203/02* (2013.01); *E04F 2203/065* (2013.01); *E04C 2003/046* (2013.01)

(58) Field of Classification Search
CPC .............. E04C 2/38; E04C 2003/0434; E04C 2003/0473
USPC .......... 52/475.1, 477, 478, 511, 578.1, 582.1, 52/588.1, 512, 513, 544, 596, 612
See application file for complete search history.

(56) References Cited

U.S. PATENT DOCUMENTS

| | | | |
|---|---|---|---|
| 1,386,554 A | | 8/1921 | Dalglish |
| 2,055,442 A | | 9/1936 | Jones |
| 2,120,195 A | | 6/1938 | Carl |
| 3,353,312 A | * | 11/1967 | Storch ............................ 52/713 |
| 3,421,281 A | | 1/1969 | Harris |
| 3,958,384 A | * | 5/1976 | Megumi .......................... 52/477 |
| 4,262,464 A | | 4/1981 | Ludowici |
| 4,553,366 A | | 11/1985 | Guerin |
| 5,010,705 A | * | 4/1991 | Akihama et al. ................. 52/477 |
| 6,055,787 A | | 5/2000 | Gerhaher et al. |
| 6,170,214 B1 | | 1/2001 | Treister et al. |
| 6,253,515 B1 | | 7/2001 | Kuelker |
| 6,427,408 B1 | | 8/2002 | Krieger |
| RE39,091 E | | 5/2006 | Kuelker |
| 7,207,147 B2 | | 4/2007 | Price et al. |
| 7,472,521 B2 | | 1/2009 | Bilge |

(Continued)

*Primary Examiner* — Brian Glessner
*Assistant Examiner* — Adam Barlow
(74) *Attorney, Agent, or Firm* — New River Valley IP Law; Michele L. Mayberry

(57) ABSTRACT

Provided are stone-like or brick-like veneer systems for covering walls. Specifically provided in embodiments are facade panels comprising: (i) a molded brick-like or stone-like panel; and (ii) a suspension rail partially embedded in the panel comprising: a first four-sided frame with horizontally and vertically disposed sides; one or more cross bar joining two or more sides of the first frame; a plurality of posts extending perpendicularly from the first frame or cross bars; a second four-sided frame in communication with the plurality of posts; a tab in communication with the frame for connecting the suspension rail to a surface.

16 Claims, 15 Drawing Sheets

(56) References Cited

U.S. PATENT DOCUMENTS

| | | |
|---|---|---|
| 7,581,365 B2 | 9/2009 | White et al. |
| 7,654,058 B2 | 2/2010 | Hatzinikolas |
| 7,716,891 B2 | 5/2010 | Radford |
| 7,841,147 B2 | 11/2010 | Moran |
| 7,895,800 B2 | 3/2011 | Overgaard |
| 7,926,237 B2 | 4/2011 | Gerkes et al. |
| 8,033,066 B2 | 10/2011 | Griffiths |
| 8,127,505 B2 | 3/2012 | Lu et al. |
| 8,161,705 B2 | 4/2012 | Pratt |
| 8,191,327 B2 | 6/2012 | Griffiths et al. |
| 8,234,828 B2 | 8/2012 | Macdonald |
| 8,240,099 B2 | 8/2012 | Hummel, III |
| 8,286,401 B2 | 10/2012 | Little |
| 8,322,103 B1 | 12/2012 | Kownacki |
| 8,336,264 B2 | 12/2012 | Sato et al. |
| 2002/0194788 A1* | 12/2002 | Bennett .......................... 49/467 |
| 2007/0151190 A1 | 7/2007 | Huff et al. |
| 2008/0155938 A1 | 7/2008 | Attebery |
| 2010/0011688 A1 | 1/2010 | Moran |
| 2010/0192495 A1 | 8/2010 | Huff et al. |

* cited by examiner

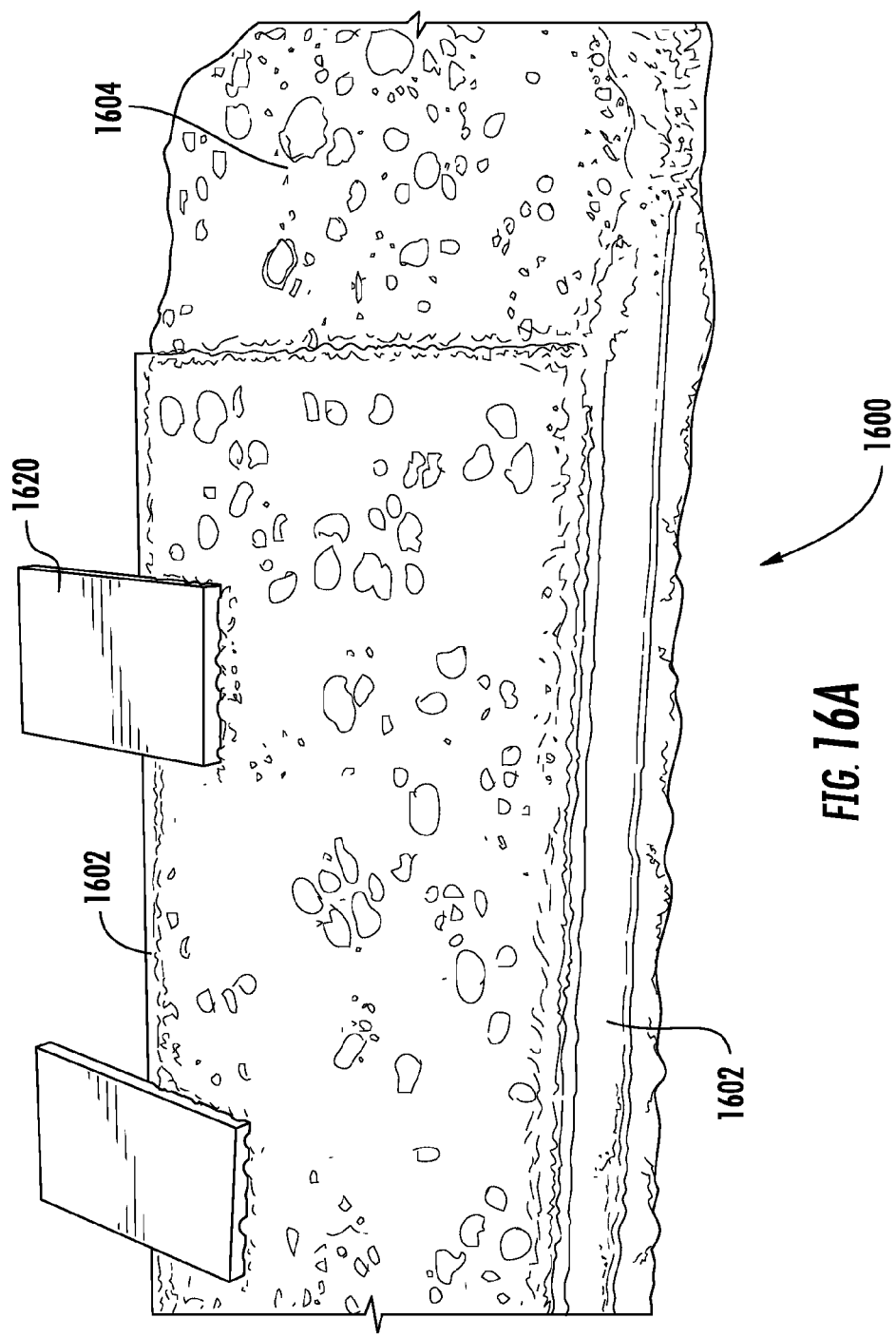

PANEL VENEER SYSTEM WITH CAGE-TYPE EMBEDDED RAIL

CROSS-REFERENCE TO RELATED APPLICATIONS

This application is related to U.S. application Ser. No. 13/179,831, filed Jul. 11, 2011, and Provisional Application Nos. 61/362,740 and 61/486,850 filed respectively on Jul. 9, 2010 and May 17, 2011, each of which application is incorporated herein by reference in its entirety.

BACKGROUND OF THE INVENTION

1. Field of the Invention

The present invention relates to the field of stone-like veneer systems for walls. Provided are facade panels comprising: (i) a molded brick-like or stone-like panel; and (ii) a suspension rail partially embedded in the panel comprising: a first four-sided frame with horizontally and vertically disposed sides; one or more cross bar joining two or more sides of the first frame; a plurality of posts extending perpendicularly from the first frame or cross bars; a second four-sided frame in communication with the plurality of posts; a tab in communication with the frame for connecting the suspension rail to a surface.

2. Description of Related Art

Conventional mortar-based facade systems, including brick and stone are as difficult to remove as they are to install. Although the strength of a mortar-based system is generally an advantageous feature, such systems are susceptible to a number of disadvantages. For example, installation of brick and stone using mortar requires favorable weather and temperature conditions to be sure the mortar sets properly. This limits installation, especially in areas where seasonal changes occur, to relatively dry and ambient conditions.

In contrast, modular mortarless systems can be installed year round regardless of external weather conditions. Likewise, modular systems have the advantage of ease of installation, not requiring special skills and so can be installed by a range of installers, from the do-it-yourself to the trained stone mason. Even further, mortarless systems because they do not have to be adhered to the entire surface area of a wall can provide better ventilation and moisture removal than conventional mortar-based veneers.

Existing mortarless systems, such as those disclosed in U.S. Pat. No. 8,322,103 entitled "Faux Brick with Suspension System," use one or more suspension rails to retain a panel resembling an arrangement of one or more bricks. To affix the panels to a wall, the top and bottom edges of the panels are retained in a track of a separate, non-embedded suspension rail. Such a system is vulnerable to pull out from the wall during extreme weather conditions (such as high winds) due to the rail and the panel being separate pieces.

Another existing mortarless system is disclosed in U.S. Pat. No. 7,841,147 entitled "Mortarless Facade System." A system described in this patent uses a suspension rail with a two semicircular loops, which during fabrication are embedded into the panels. The panels are then secured to a wall using a fastening device or adhesive to secure the suspension rail and thus the panel to the wall. In an embodiment, the panel has a convex rounded upper edge and a corresponding concave rounded lower edge for mating with upper and lower panels of the system. The system provides two suspension rails for each panel, with only a portion of each rail embedded in the panel, along only two sides of the panel. Such a design is susceptible to failure due to only a small portion of the panel being supported by the suspension rail.

What is desired is a facade that has the appearance and strength of a stone and mortar or brick and mortar installation, but which is cost effective to manufacture and install. Ease of installation is also a plus without compromising on aesthetic appeal. Thus, what is needed is a modular, preferably non-mortar system that addresses the disadvantages of conventional mortar-based systems, but has the strength, ease of installation, and aesthetic appeal of and aesthetic similarity to these conventional systems.

SUMMARY OF THE INVENTION

To address these issues, embodiments of the present invention provide veneer systems comprising a plurality of panels each with a cage-like embedded suspension rail. Also included within the scope of the invention are the panels themselves, the suspension rails whether embedded or stand alone, as well as methods of making the panels and methods of using the systems of the invention.

Embodiments of the invention provide a facade panel comprising: a molded brick-like or stone-like panel; and a suspension rail partially embedded in the panel comprising: a first four-sided frame with horizontally and vertically disposed sides; one or more cross bar joining two or more sides of the first frame; a plurality of posts extending perpendicularly from the first frame or cross bars; a second four-sided frame in communication with the plurality of posts; a tab in communication with the frame for connecting the suspension rail to a surface. Veneer systems comprising one or more of these panels are included within the scope of the invention, along with methods of using the systems and panels and methods of making them.

Preferred are such facade panels, wherein the tab comprises one or more void. The void is preferably configured to receive a fastener to fix the suspension rail and thus the stone-like or brick-like panel to a wall. Any number of voids can be used.

In embodiments, the tab for fixing the suspension rail to a surface can be disposed completely or partially along a side of the first frame. Preferred is such a facade panel, wherein the tab is disposed completely along a side of the first frame and is in a stepped configuration with respect to that side of the first frame.

A plurality of voids may also be disposed along a side of the first frame opposing the side of the first frame with the tab. Having voids on both the upper and lower edges of the suspension rail will allow for easy alignment of the panels on a wall by aligning the voids on the tab of one suspension rail with the voids along the lower edge of another suspension rail.

In preferred embodiments, the facade panel includes a tab with a spacing and/or directional indicator. When installing the panels on a wall, this indicator can be used to align panels in a second row disposed at a desired position relative to panels in a first row.

The suspension rails can also comprise one or more cross bar disposed perpendicular to a side of the suspension rail frame. Alternatively or in addition, the one or more cross bar can be disposed at an angle less than perpendicular to a side. In preferred embodiments, the cross bar(s) are disposed at a diagonal within the interior of the frame. The second frame can also comprise optional cross bars as well. Especially preferred is a facade panel comprising cross bars disposed in an X configuration. Even further, the cross bars can be fortified with a perpendicular support, if desired.

Side tabs can also be incorporated into the suspension rail embodiments. Such side tabs are useful for ensuring proper spacing between panels in each row. For example, the panel can comprise side tabs disposed perpendicular to opposing sides of the first frame and on sides perpendicular to the side with the tab. This ensures that during installation one panel is spaced a desired amount away from another panel in a row by abutting the side tab of one suspension rail against a corresponding tab of the suspension rail of another panel.

The sides of the first frame can have a width greater than their thickness and the sides of the second frame can have a thickness greater than their width. With the first frame wider than it is thick, this provides for a substantially planar face, which is helpful for a secure connection with a wall by being supportive over a large planar area of the wall. The suspension rail can also have a rippled surface on the face that is intended to abut the wall. Such a rippled surface may provide for additional support and/or for ventilation between the wall and rail.

In embodiments, the facade panel can have a perimeter of the first frame that is larger than a perimeter of the second frame. In this manner, when embedded in the panel, the second frame will be completely embedded in the material and not be exposed. Preferred is a suspension rail where the second frame is entirely embedded in the molded panel and wherein the posts are partially embedded in the molded panel to provide for a gap between the first frame and the molded panel. Also preferred are such suspension rails that are 3-D printed.

BRIEF DESCRIPTION OF THE DRAWINGS

The accompanying drawings illustrate certain aspects of some embodiments of the present invention, and should not be used to limit or define the invention. Together with the written description the drawings serve to explain certain principles of the invention.

FIGS. 16A-B are schematic diagrams showing a back perspective view (FIG. 16A) and a side perspective view (FIG. 16B) of a panel embodiment of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1:
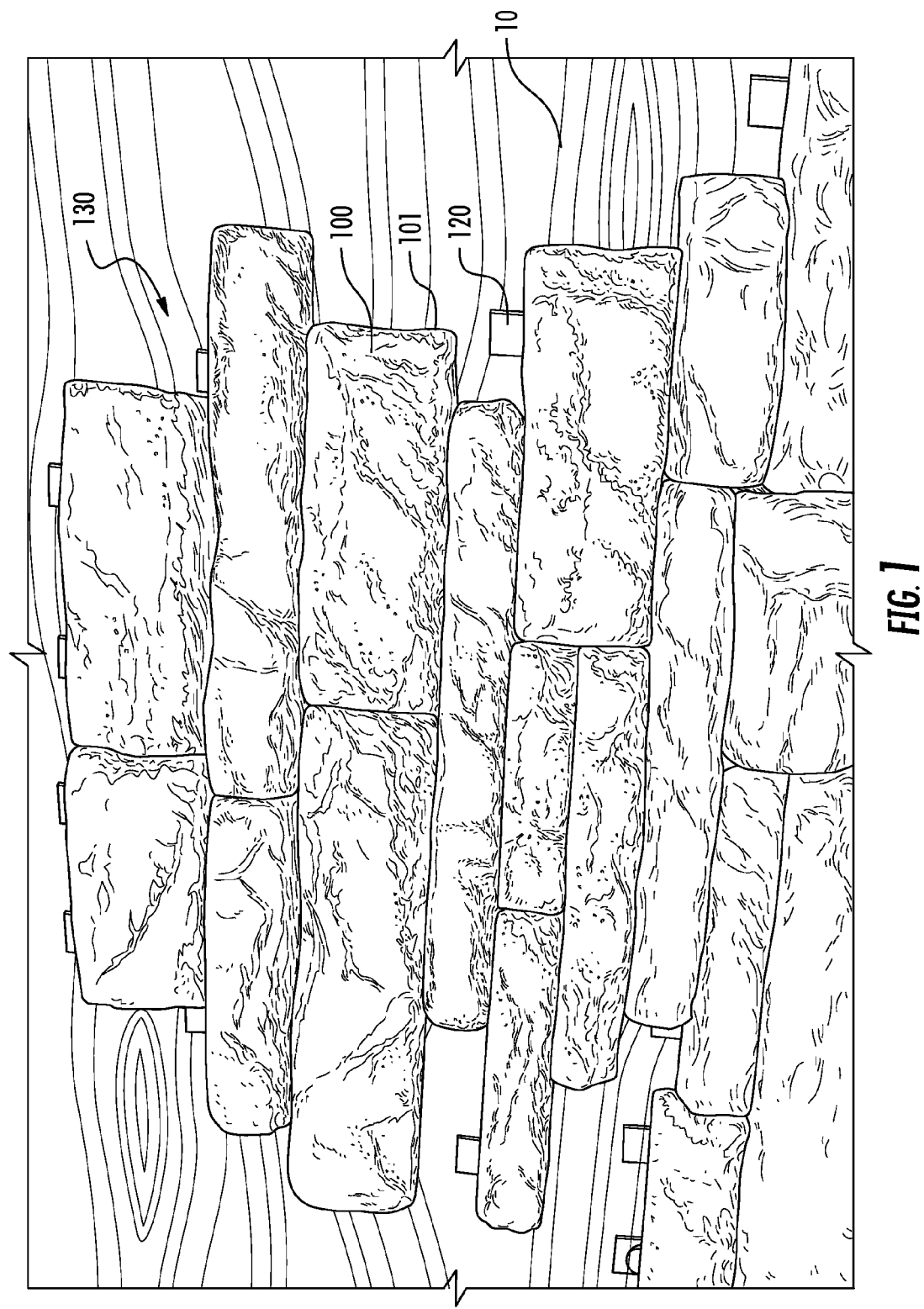
FIG. 1 is a schematic drawing showing a front perspective view of an embodiment of an exemplary facade system of the invention comprising panels of single stones each with an embedded L-shaped suspension rail or clip, where the plurality of stones is arranged to cover a portion of a wall.

Facade panels, suspension rails for supporting facade panels, and facade systems incorporating such facade panels and suspension rails are included within the scope of the invention. In embodiments is provided a veneer system comprising a plurality of facade panels each with one or more embedded suspension rails. As shown in FIG. 1, a facade system 130 of the invention can comprise one or more panels 100. Each panel is configured to represent a single stone or brick (or may represent multiple stacked stones or bricks) and each panel comprises one or more embedded L-shaped suspension rail or clip 120 embedded in the rear face 101 of the panel 100. When installed on a substrate surface 10, the rear face 101 of the panel 100 faces substrate surface 10. Here, the substrate shown is a piece of plywood, but can be any material such as drywall, cement, hardy board, fiber board, etc. As shown in FIG. 1, in the systems 130 of the invention, a plurality of panels 100 can preferably be arranged to cover a wall or a portion of a wall 10.

Figure 2A:
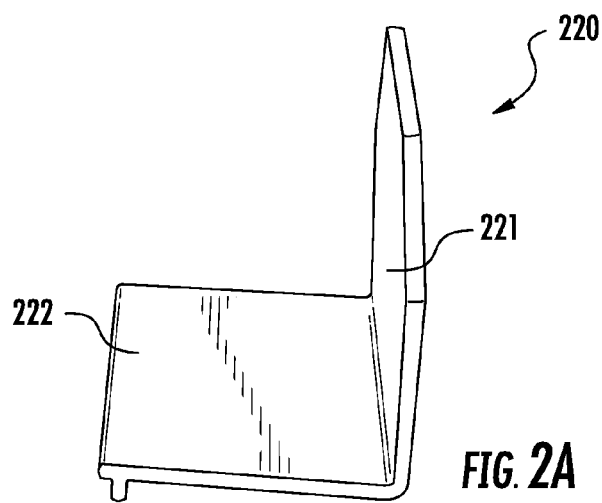
FIGS. 2A-C are schematic drawings illustrating an exemplary L-shaped clip.
Figure 2B:
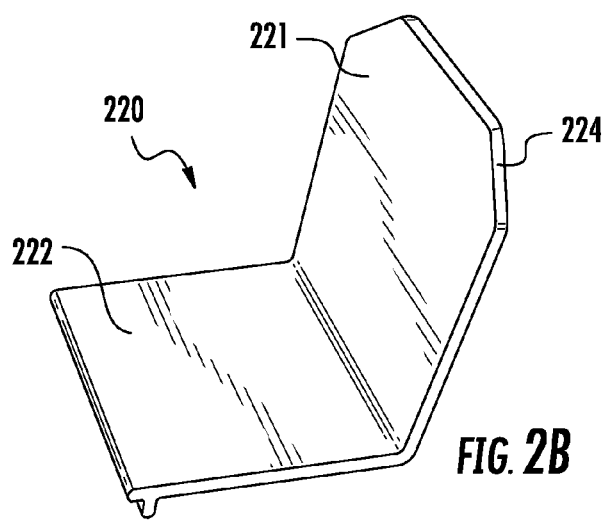
Figure 2C:
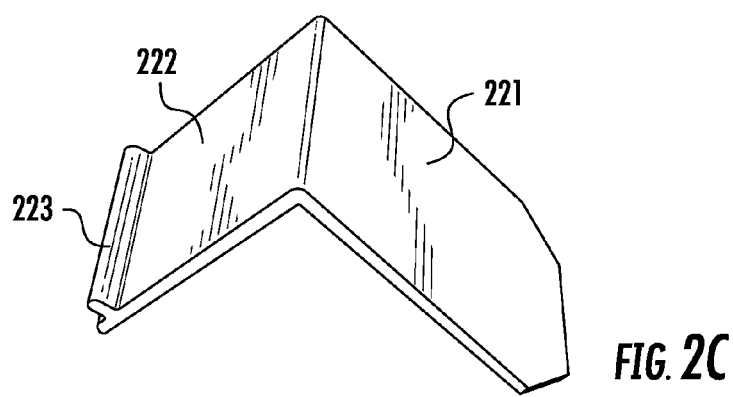

FIGS. 2A-C are schematic drawings illustrating an exemplary L-shaped clip 220 (otherwise referred to as an L-clip) that can be used in embodiments of the invention. In the context of this specification, the terms clip and suspension rail may be used interchangeably to refer to an embedded support for a panel of the system. In embodiments, at least a portion of the clip or suspension rail 220 is embedded in the rear face of the panel (the side of the panel that faces the wall when installed as a facade system). The L-shaped clip or suspension rail 220 is preferably made of plastic or a composite material and can be quickly and easily fabricated using a traditional plastic manufacturing techniques, including by injection molding, thermoforming, or even using a silicon, composite, or polyurethane molding process, or a 3-D printing machine. The L-clip 220 can be fabricated from composite or metal materials. The typical thickness of the L-clip is between 0.1 and 0.5 inches. The L-clip provides a first planar attachment member 221 and a second planar embedding member 222, where the two planar members 221, 222 are disposed relative to one another at substantially a right angle. In this specification, the planar members 221, 222 may also be referred to as a planar surfaces. Each of these components may be molded, carved or shaped individually and then attached together to form the L-clip, or the L-clip can comprise a single, seamless piece of material which is shaped to reflect these distinct sections. If metal or plastic is used as the L-clip, a single piece of material can be provided and then folded into the desired L-shaped configuration.

As shown in FIGS. 2A-C, the second planar embedding member 222 can comprise one or more protrusions 223 along an edge. The second planar embedding member 222 is the portion of the clip 220 that is embedded into the panel. The protrusion 223 may be elongated and may be disposed on the first planar member completely or partially along the width of the clip and can have a cross section of any shape. The protrusion on the first planar member should be shaped and sized to resist pull out from the panel when the first planar member is embedded therein. In preferred embodiments, the protrusion is elongated with a cross section of a curvilinear or rectilinear polygon disposed approximately perpendicular to the planar surface. The thickness of the protrusion is approximately the same as that of the first planar member. Each side of the first planar member typically has a length between 0.5-3 inches and all sides are approximately equal to one another in length. It is not critical how wide, thick, or long the first or second planar members are and these features may be desiged accordingly for a particular type of panel. Generally, the greater the dimensions, the greater the support provided to the panel, so a larger panel may benefit more from a larger L-shaped clip.

The first planar attachment member 221 is used to attach the panel to a wall when the clip is embedded in a panel. The first planar attachment member 22 comprises an upper edge 224. In preferred embodiments, the upper edge 224 is shaped. Here, the upper edge 224 is shaped by removing the corners of the material. The first planar attachment member 221 is preferably elongated substantially in the shape of a rectangle. Although a square or other configuration can be used for the first planar attachment member 221, the rectangular shape is desired to provide for the clip to be embedded at a lower height within the panel, while allowing for the second planar member to extend beyond the upper edge of the panel (as shown in FIG. 1). In one embodiment, the first planar attachment member 221 can have a width of about 0.5-1 inch and a length of about 1-3 inches, while the second planar embedding member 222 can have a width of about 0.5-1 inch and a length of about 0.5-1 inch. These dimensions can be scaled up or down to accommodate larger or smaller panels as desired. Due to the first and second planar members being disposed perpendicular to one another, together the two planar members 221, 222 form an L-shape clip 220.

Figure 3:
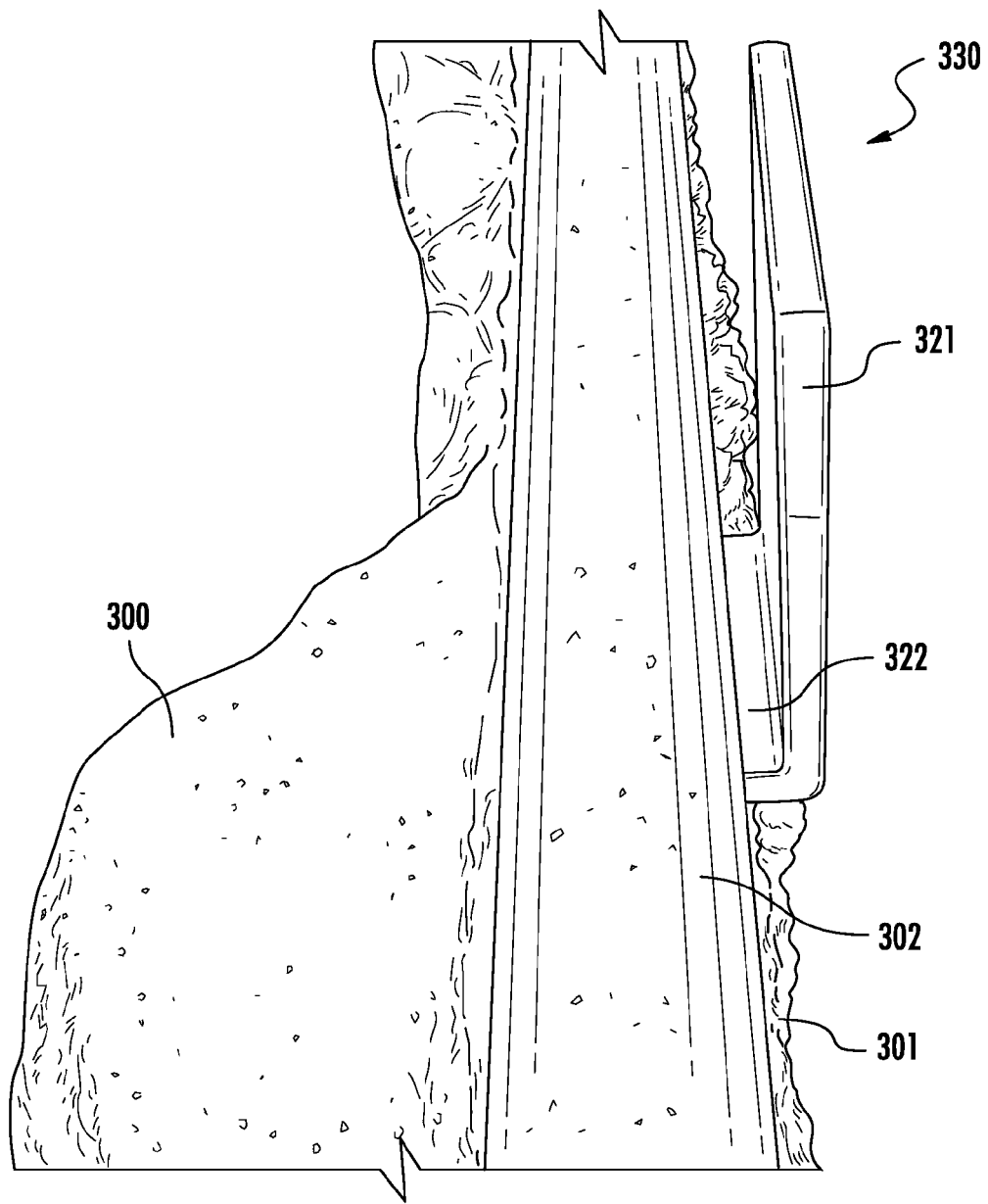
FIG. 3 is a schematic drawing showing a top side perspective view of an exemplary panel of systems of the invention comprising an embedded L-shaped suspension rail and a rounded upper edge or "bull nose" edge.

FIG. 3 is a schematic drawing showing a top side perspective view of an exemplary panel of systems 330 of the invention comprising an embedded L-shaped suspension rail and a rounded upper edge or "bull nose" edge 302. As shown, the L-clip is preferably embedded into the back of a panel using second planar embedding member 222 in a manner to allow an air space between the panel and the clip. In embodiments, this means that the second planar member 222 is embedded only partially into the back face 301 of the panel. Once installed on a wall by attaching the first planar member 221 to the wall, this gap between the clip and the panel will allow for air flow between the panel and the wall and for condensation or water to pass through the gap instead of interfering with the panel or panel system. In existing technologies, especially traditional mortar systems, where there is no gap between the facade and the substrate, the presence of water may degrade the veneer system. The bull nose shaping 302 on the top and bottom edges of the panel 300 allow for interlocking of the panels of the systems when stacked and installed on a wall. In embodiments, the upper edge is a convex rounded shape and is shaped and sized to interlock or mate with a lower edge of a panel that is of a corresponding convex rounded shape. The upper or lower edges can also be configured to have a square cross-sectional shape, where one edge provides a protrusion and the other edge provides a recess far mating with and accepting the protrusion. Any shape edge can be used to mate with another edge in the system. In embodiments, only a portion of the edge or less than the entire length of the edge is shaped for interlocking with another panel.

Embodiments of the invention further provide a cage-type clip. In the context of this specification what is meant by a cage-type clip is a suspension rail with structure that is almost cage-like in appearance. For example, the suspension rail can comprise a substantially planar member with a plurality of posts projecting at substantially a right angle from the planar member, which posts terminate in and are joined together by a ring of material disposed in a plane substantially parallel to the first planar member. In preferred embodiments, the cage-type rail is preferably made of plastic and is preferably 3-D printed, but can be made according to any conventional plastic manufacturing technique.

Figure 4:
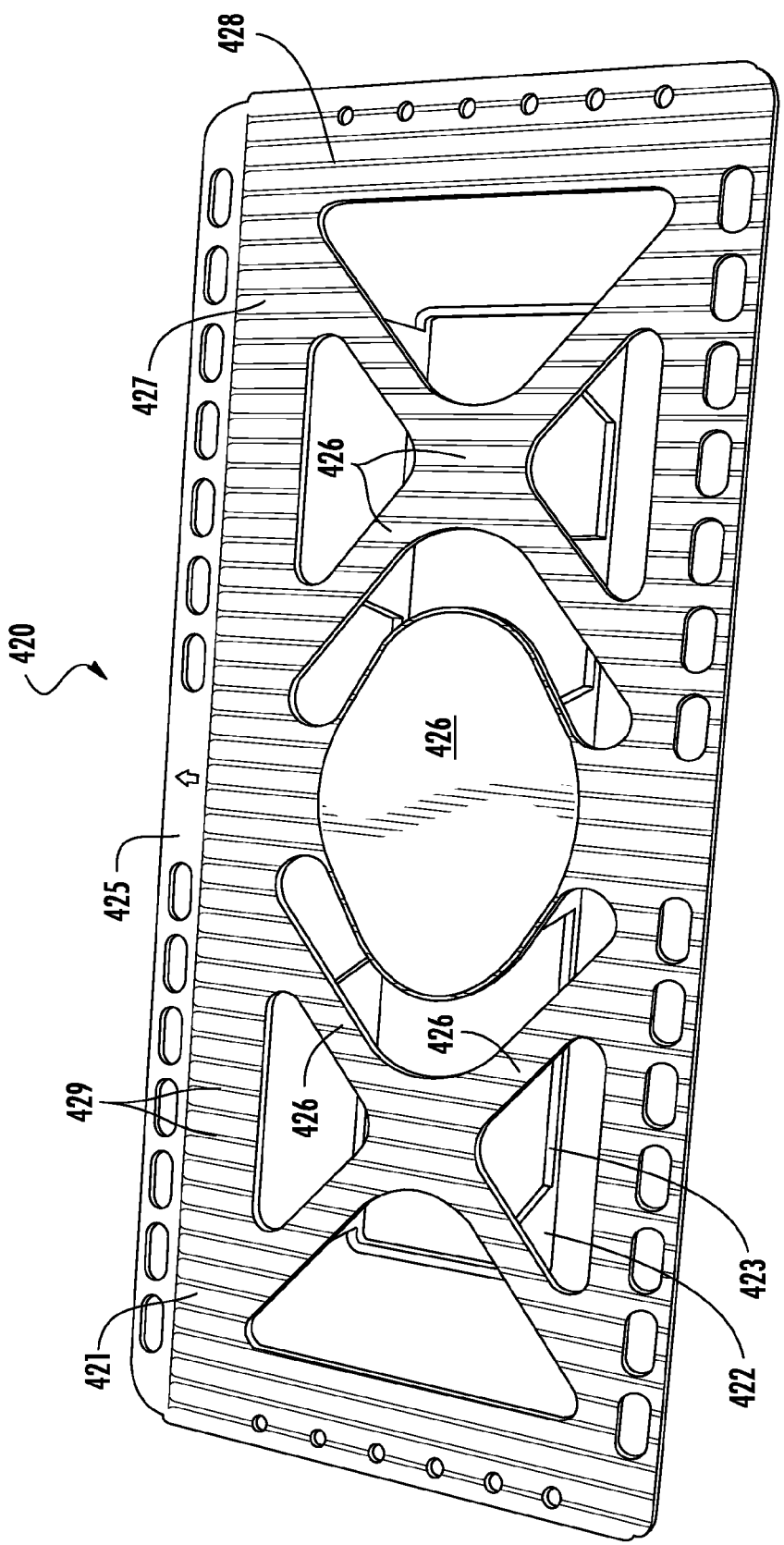
FIG. 4 is a schematic drawing showing a rear perspective view of an exemplary cage-type suspension rail according to the invention.

FIG. 4 is a schematic drawing showing a rear perspective view of an exemplary cage-type suspension rail according to the invention. In the context of this specification, the directional terms used to describe the suspension rails and panels, such as top, bottom, left, right, rear, front, vertical, or horizontal, are not intended to be used in a limiting fashion. Rather, these terms are used to indicate one way the panels and suspension rails can be installed but any direction for any purpose is included. The clip can be fabricated from plastic, composite or metal materials. The typical thickness of the material is between 1 mm to 0.5 inches, such as from 2-5 mm, for example 3-4 mm. One or more components of the clip may be molded, carved or shaped individually and then attached together to form the cage clip, or the cage clip can comprise a single, seamless piece of material.

As shown in FIG. 4, provided is a cage type suspension rail 420 comprising: a first four-sided frame 421 with horizontally and vertically disposed sides. This is also referred to as the first planar attachment member 421, which when embedded in a panel is used to attach the panel to a wall, especially by way of upper attachment tab 425. The suspension rail also comprises one or more cross bar 426 joining two or more sides of the first frame; a plurality of posts 422 extending perpendicularly from the first frame or cross bars; a second four-sided frame 423 in communication with the plurality of posts; and a tab 425 in communication with the frame for connecting the suspension rail to a surface.

In embodiments and to save on material costs the first planar attachment member 421 of the suspension rail can comprise a substantially planar member with voids. In this embodiment, the planar member 421 is essentially a frame comprising two horizontal edges 427 and two vertical edges 428 with interior supports 426 connecting two or more edges of the frame. As illustrated, there are two interior supports 426 shown in an "X" pattern between the horizontal edges 427 and another interior support 426 joining the two horizontal sides of the planar member perpendicularly. In FIG. 4, the face of the planar member shown is the surface that abuts a wall when installed. This face can be rippled 429 as illustrated.

Figure 5:
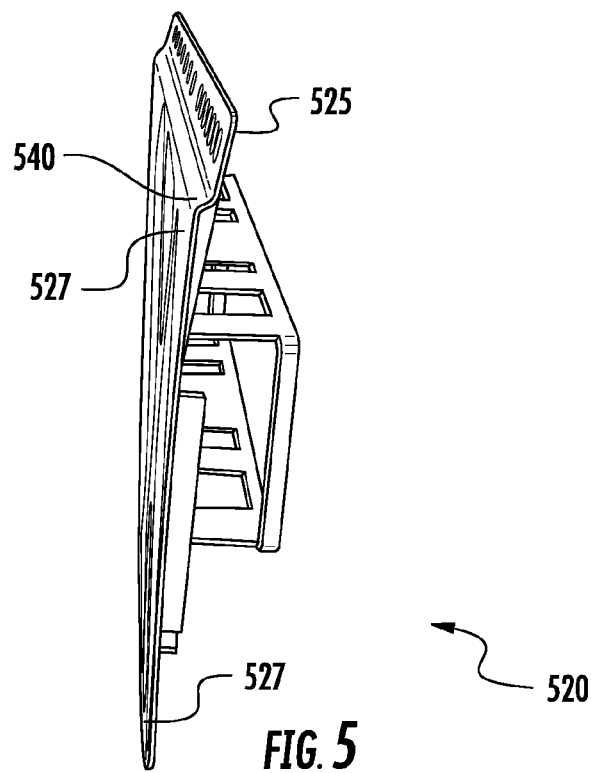
FIG. 5 is a schematic drawing showing a side perspective view of the suspension rail shown in FIG. 4.

FIG. 5 is a schematic drawing showing a side perspective view of the suspension rail shown in FIG. 4. In this embodiment, suspension rail 520 comprises an attachment tab 525 along the upper horizontal edge 527 of the first planar member. This attachment tab 525 is provided in a stepped configuration 540 from the upper horizontal edge 527 of the first planar member. Preferably, the upper attachment tab 525 is stepped away from the upper horizontal edge 527 of the first planar member an amount that is the same as or slightly larger than the thickness of the first planar member. This stepped surface 540 is useful in that when installing a plurality of panels on a surface, one suspension rail 520 of one panel can be placed behind the suspension rail of another panel. For example, during installation of a veneer system, the lower horizontal edge 527 of one suspension rail can be positioned behind the tab of another suspension rail. The length of the horizontal edge 527 can be disposed in contact with the edge of the first planar member where the step 540 is located. In this manner, the suspension rails and thus the panels are self aligned during installation.

Figure 6:
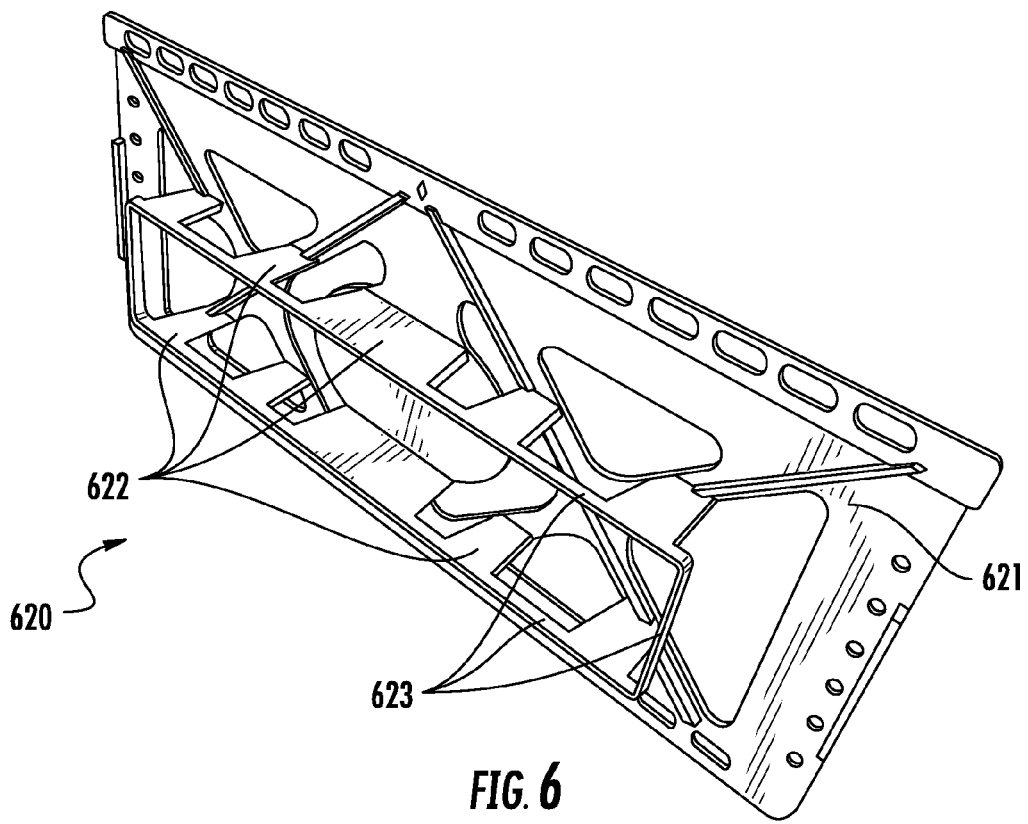
FIG. 6 is a schematic drawing showing a front perspective view of the cage-type suspension rail shown in FIGS. 4-5.

FIG. 6 is a schematic drawing showing a front perspective view of the cage-type suspension rail shown in FIGS. 4-5. As illustrated, the first planar attachment member 621 (otherwise referred to as the first four-sided frame) of suspension rail 620 comprises a plurality of posts 622 disposed perpendicular to the first four-sided frame 621. Here, there are ten support posts 622, however, any number is acceptable, especially from 2-20, such as from 5-15, or preferably 6-10. The support posts 622 can also be any configuration from cylindrical posts to planar members. Here, the support posts are shown as planar members, with planar support posts being stronger and more desired. The support posts 622 are connected to a ring of material 623 disposed in a plane parallel to the first planar member 621. This ring of material 623 is also referred to as the second four-sided frame 623. The second four-sided frame 623 can be any shape or thickness, as here it is illustrated as a rectangle. The support posts 622 and the second four-sided frame 623 are the portions of the suspension rail that are embedded in a panel. Preferably, the support posts of the suspension rail are embedded partially in the panel to leave an air space between the first planar member and the panel. This air space is desired during installation of the panels on a wall to provide for ventilation between the panel and the wall.

Figure 7:
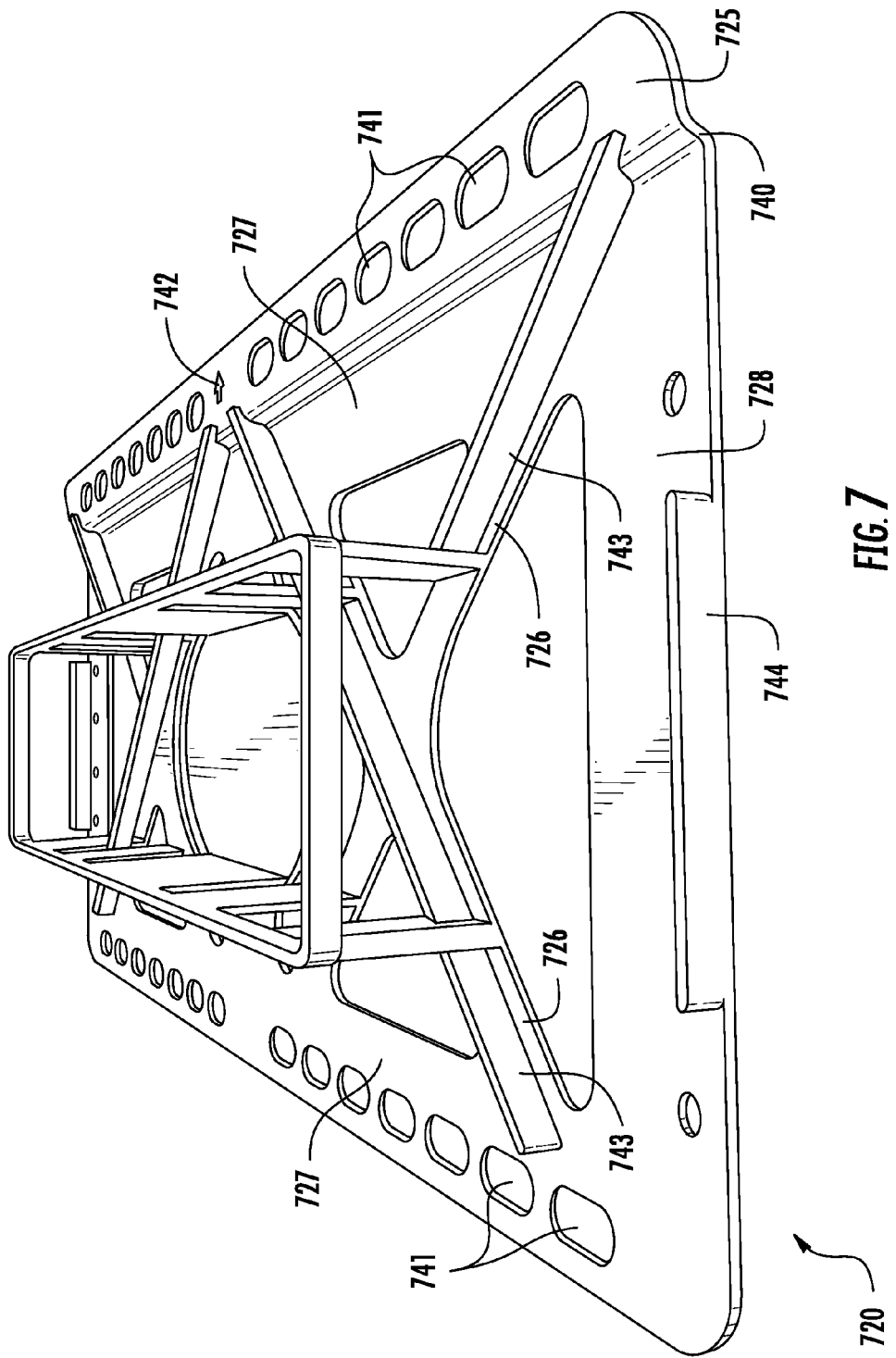
FIG. 7 is a schematic drawing showing a front side perspective view of the suspension rail illustrated in FIGS. 4-6.
Figure 8:
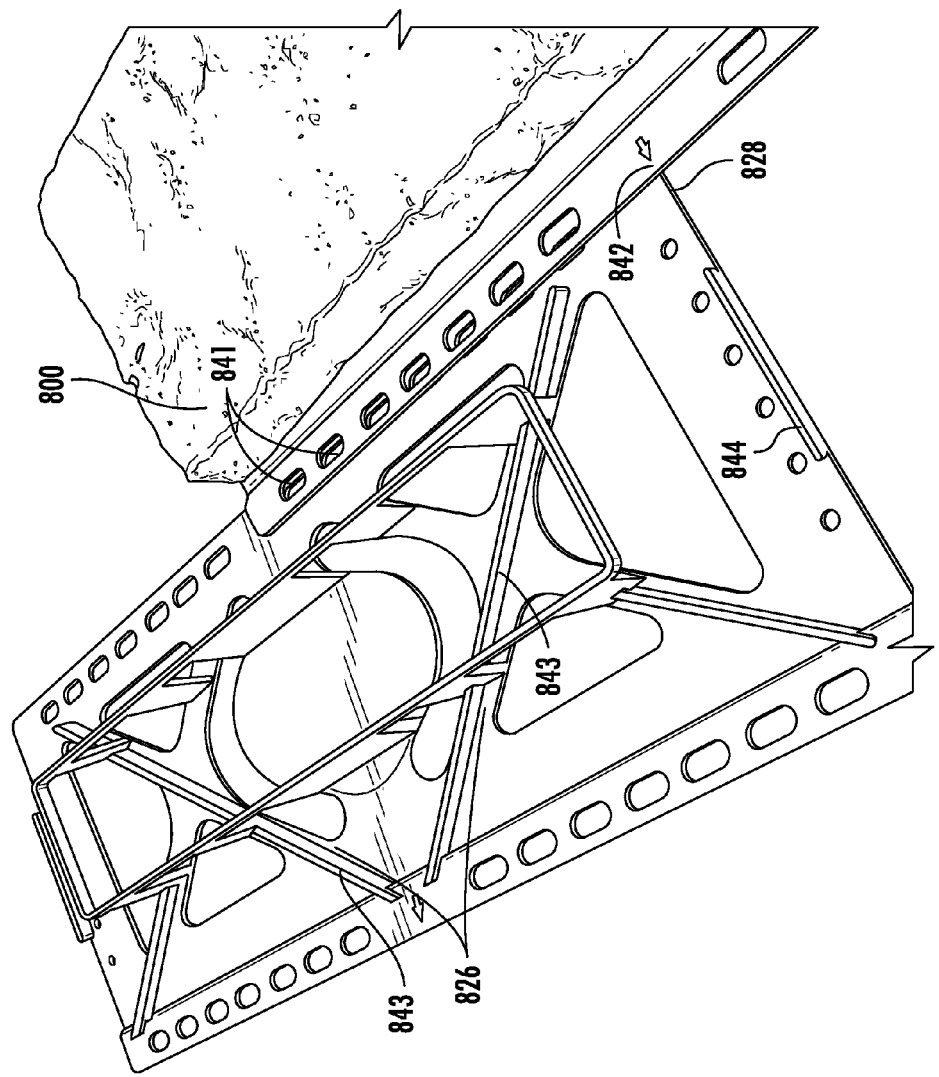
FIG. 8 is a schematic diagram showing a front perspective view of the suspension rail shown in FIGS. 4-7 in combination with another suspension rail demonstrating the self-aligning capability of the suspension rails.

FIGS. 7-8 are schematic drawings of other views of the suspension rail illustrated in FIGS. 4-6. As shown in FIG. 7, along the upper portion of the suspension rail 720 there is an elongated step 740 and upper tab 725. In preferred embodiments, upper tab 725 comprises one or more voids 741 and a spacing/directional indicator 742. Any number of voids 741 along the horizontal edges 727 or upper tab 725 of the first four-sided frame can be used.

As demonstrated in FIG. 8, during installation of the panels 800, the voids 841 can be aligned with one another and the directional indicator (arrow) 842 aligned with an edge of a vertical side 828 of the suspension rail. The plurality of voids can be used for receiving a fastening device, such as a screw or mortar, and the directional indicator can be used for easy and accurate orientation of the clip during installation. The fastening device can include for example adhesive, or a nail, screw, bolt, or staple, for securing an object to a wall surface. The dimensions of the clip are dependent on the size of the panel and are preferably sized such that a portion of the horizontal edges extend beyond the panel face. In most cases this length would not exceed 24 inches, however, the clip is scalable up or down to accommodate larger or smaller structures.

Further illustrated in FIGS. 7-8 are additional support features 743, 843 projecting perpendicularly from the first planar member (the first four-sided frame). Here, the additional support structures 743, 843 are disposed on the "X" supports 726, 826 to provide additional strength to the suspension rail. These additional support features can be disposed anywhere on the first planar member. The suspension rail can also comprise one or more side tabs 744, 844 for easy alignment of the suspension rails and panels during installation of the systems. Side tabs 744, 844 are preferably perpendicular supports along one or both vertical sides 728, 828 of the first four-sided frame of the suspension rail. During installation, the side tab 744, 844 of one suspension rail is abutted against the side tab 844, 744 of another suspension rail to ensure alignment of the panels with respect to one another. Together or separately, the voids 741, 841 along the horizontal edges of the suspension rail, and the spacing/directional indicator 742, 842, as well as the side tabs 744, 844 can contribute to the self-aligning capability of the suspension rails.

Figure 9:
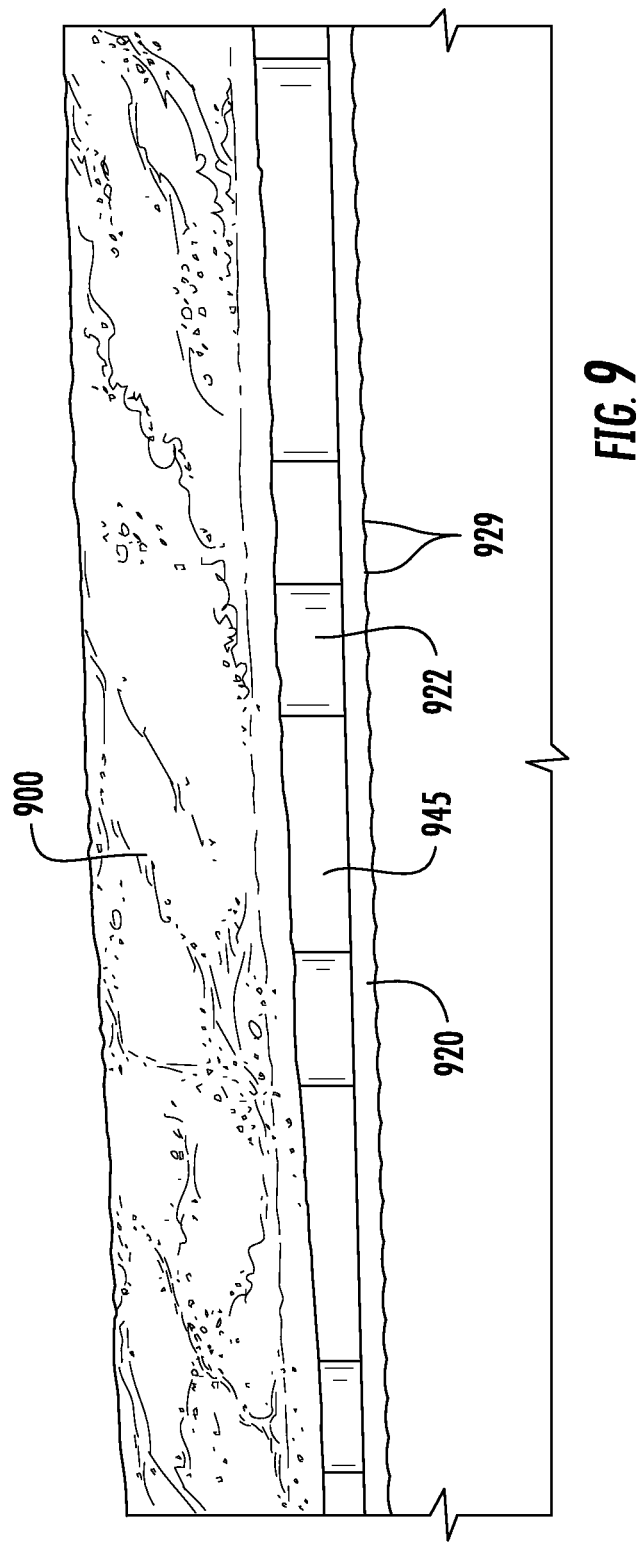
FIG. 9 is a schematic diagram showing a side perspective view of a panel of the invention with an embedded suspension rail, with spacing between the panel and rail.

FIG. 9 is a schematic diagram showing a side perspective view of a panel of the invention 900 with an embedded suspension rail 920, with spacing 945 between the panel and rail. As shown, only a portion of the support posts 922 are embedded in the panel material, which provides for spacing between the panel and the suspension rail and consequently a ventiallation area between the panel and wall to which the panel is installed. Further, as shown in FIG. 9, the rear face of the suspension rail 920 in one embodiment comprises a rippled surface 929 for increased strength or stiffness in the suspension rail.

Any material can be used to manufacture the panels, including plastic, rubber, wood, stone, metal, glass, cement, ceramic, porcelain, or composite materials. A preferred stone-like material that is light weight can be manufactured from a combination of cement, aggregate, pigments, and admixes. Preferred materials are easy to mold into a desired shape or size and are of a consistency to allow for ease of embedding one or more suspensions rail into the material.

Figure 10:
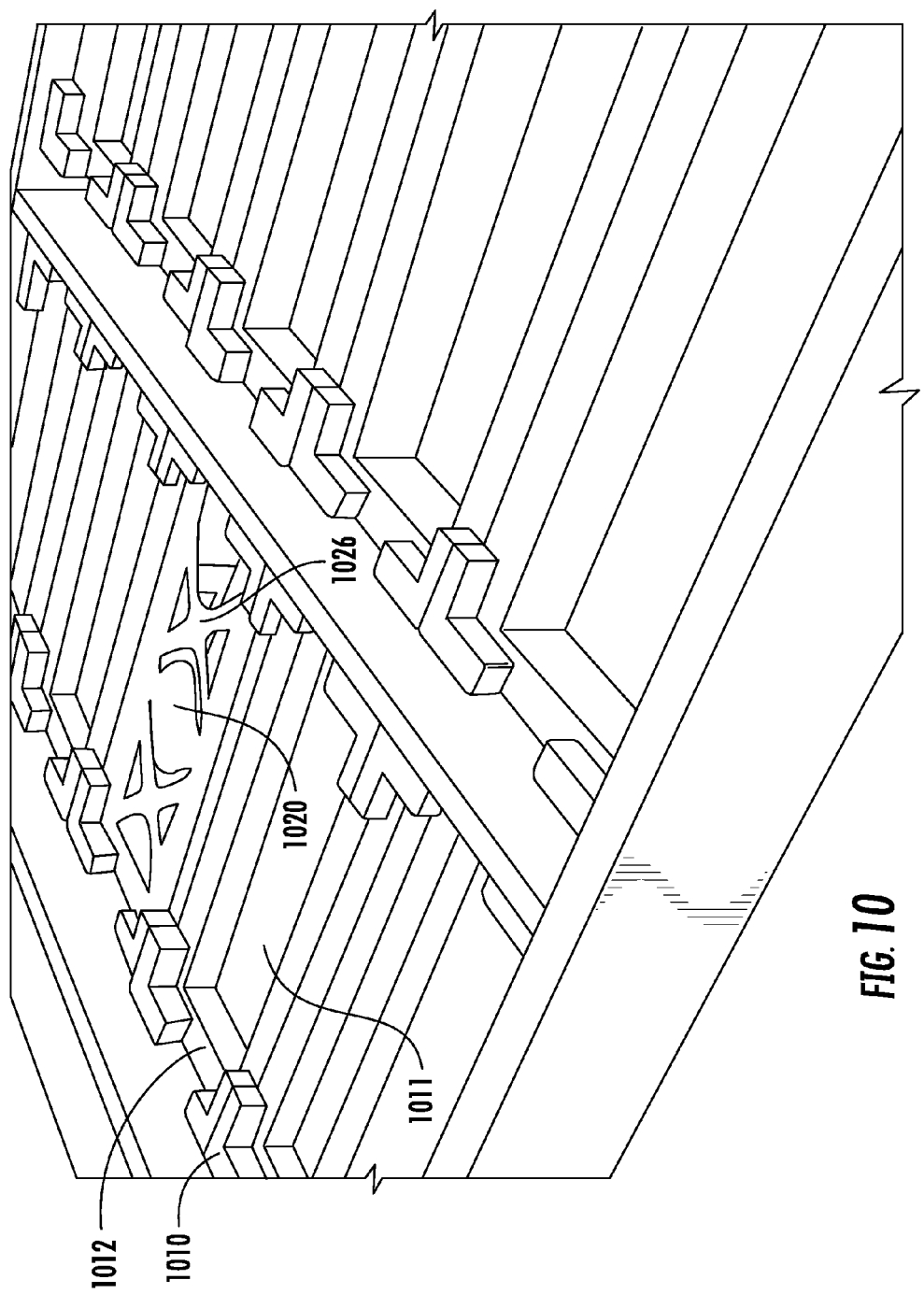
FIG. 10 is a schematic diagram showing a perspective view of an array of molds for manufacturing a plurality of panels of the invention, where a suspension rail is disposed in a mold to illustrate how a suspension rail is embedded in a panel.
Figure 11:
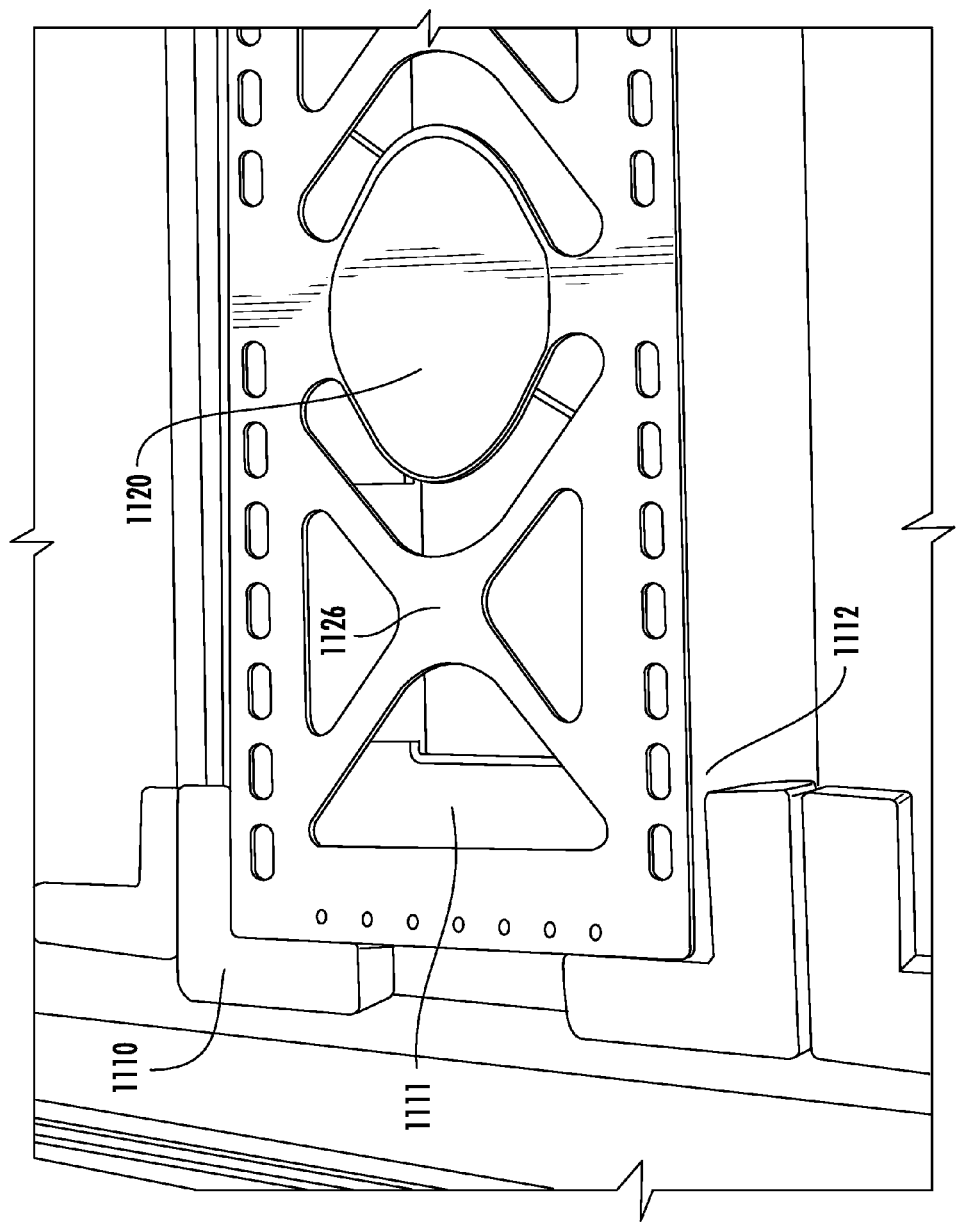
FIG. 11 is a schematic diagram showing a close up of a mold shown in FIG. 10 with the suspension rail placed within the mold.

Included within the scope of the invention is a method of manufacturing construction panels with embedded suspension rails. As shown in FIGS. 10-11, a polyurethane or silicone mold 1010, 1110 can be use to make any desired shape and size panel. Preferably, the panels and thus the corresponding molds 1010, 1110 are constructed to give an appearance similar to brick or stone. Typically, the exterior facing surfaces of the panel are shaped by the mold and the back of the panel is not molded. However, in embodiments and as discussed in more detail below, it may be preferred to shape or mold at least part of the back surface of the panel. To construct an embedded panel of the invention, the molding material for the panel (e.g., concrete or a composite) can be deposited into the well 1011, 1111 of the mold either manually or automatically. All five interior surfaces of the mold well 1011, 1111 are configured such that when the material to be molded is placed in the well an imprint on the final molded product will result, which imprint has the appearance of brick or stone. The suspension rails (for example, L-shaped or cage type) 1020, 1120 are inserted, manually or automatically, into the material to be molded, while the concrete or composite material is still in a flowable state. This is performed in a manner to dispose the second planar embedding member or the second four-sided frame of the clip into the material for the panel. As illustrated in FIGS. 10-11, the suspension rail is positioned in the mold to position the cage portion of the suspension rail in the material to be molded. Vibrational agitation can be applied to the mold trays to remove air bubbles and ensure that the maximum amount of panel forming material is in direct contact with the mold well. Removal of the air bubbles is generally preferred because air bubbles can both compromise the structural integrity of the panel, and lead to unwanted deformities in the surface pattern. The molding material is allowed to harden or cure. The drying process can be performed at room temperature in air or at an elevated temperature.

As shown in FIGS. 10-11, and in preferred embodiments, the mold 1010, 1110 has a shelf 1012, 1112 for holding the suspension rail 1020, 1120. This shelf positions the suspension rail automatically in a desired position for embedding the suspension rail in the panel. For example, the material for the panel fills the mold to a certain desired level below the shelf. When the suspension rail is inserted into the material that will harden to form the panel, the suspension rail is embedded at a set depth into the panel by virtue of resting on the shelf which supports the perimeter of the suspension rail during the embedding process. In embodiments, the mold is filled with the molding material to a depth that allows for an air gap between the panel and the suspension rail when embedded therein. Due to the configuration of the first planar member of the suspension rail (here, the first four-sided frame), voids between cross bar supports allow for a machine to pick up the suspension rail and place it on the shelf of the mold automatically. For example, a machine can be configured to hold onto the suspension rail at the "X" support position 1026, 1126, then release the rail when placed on the shelf of the mold. In this manner, the panels can be fabricated quickly and easily, as well as uniformly. Each mold is designed and appropriately sized to prevent the suspension rail from being inserted completely into the molding material. Typically, the first planar member of the suspension rail is disposed between about 0.2 to 2 inches above the molding material that hardens to form the panel. In preferred embodiments, there is a spacing between the panel and the suspension rail of about 1-20 mm, such as about 2-15 mm, or about 3-10 mm, or from about 4-8 mm, such as about 5 mm. In one embodiment, this spacing is about 0.3 inches. When the concrete or composite material has solidified, brick or stone facade structures with embedded cage clips are removed from the mold wells and packaged for delivery or sale.

The panels can be installed on any substrate. Preferably, the panels are used to form a veneer of a wall surface, whether indoor or outdoor. In one embodiment of an installation method, starting on the bottom of the wall, the facade element (panel) is positioned at a desired location. A fastening device such as a screw or nail is then driven through one or more voids disposed along the bottom and side edges of the suspension rail, and into the substrate. The next panel is then positioned such that a side tab of its suspension rail is positioned adjacent the side tab of the panel/suspension rail already installed. This step is repeated until a first row of panels is covering the desired length of wall. Once a first row of panels has been secured along the bottom edge of the wall, a second row of panels is installed in a horizontal row above the first row. Each panel in the second row is initially aligned by inserting the bottom edge of the suspension rail behind the top tab of a suspension rail in the first row until the stepped edge of one suspension rail contacts the bottom edge of the other. After the initial alignment, the panel being added to the second row is further positioned by horizontally sliding the panel and aligning its bottom edge voids with the voids of the top tab of the panels in the first row. Even further, for creating a traditional brick type installation, the edge of the panel being installed can be positioned such that one corner of the suspension rail is in line with the positioning indicator (arrow) of a panel in the first row. A fastening device such as a screw or nail is then driven through the aligned voids. This step is repeated until a second row of panels is covering the desired length of wall. This procedure of installing the panels one row at a time may be repeated until the desired area of wall has been covered.

Figures 12A, 12B:
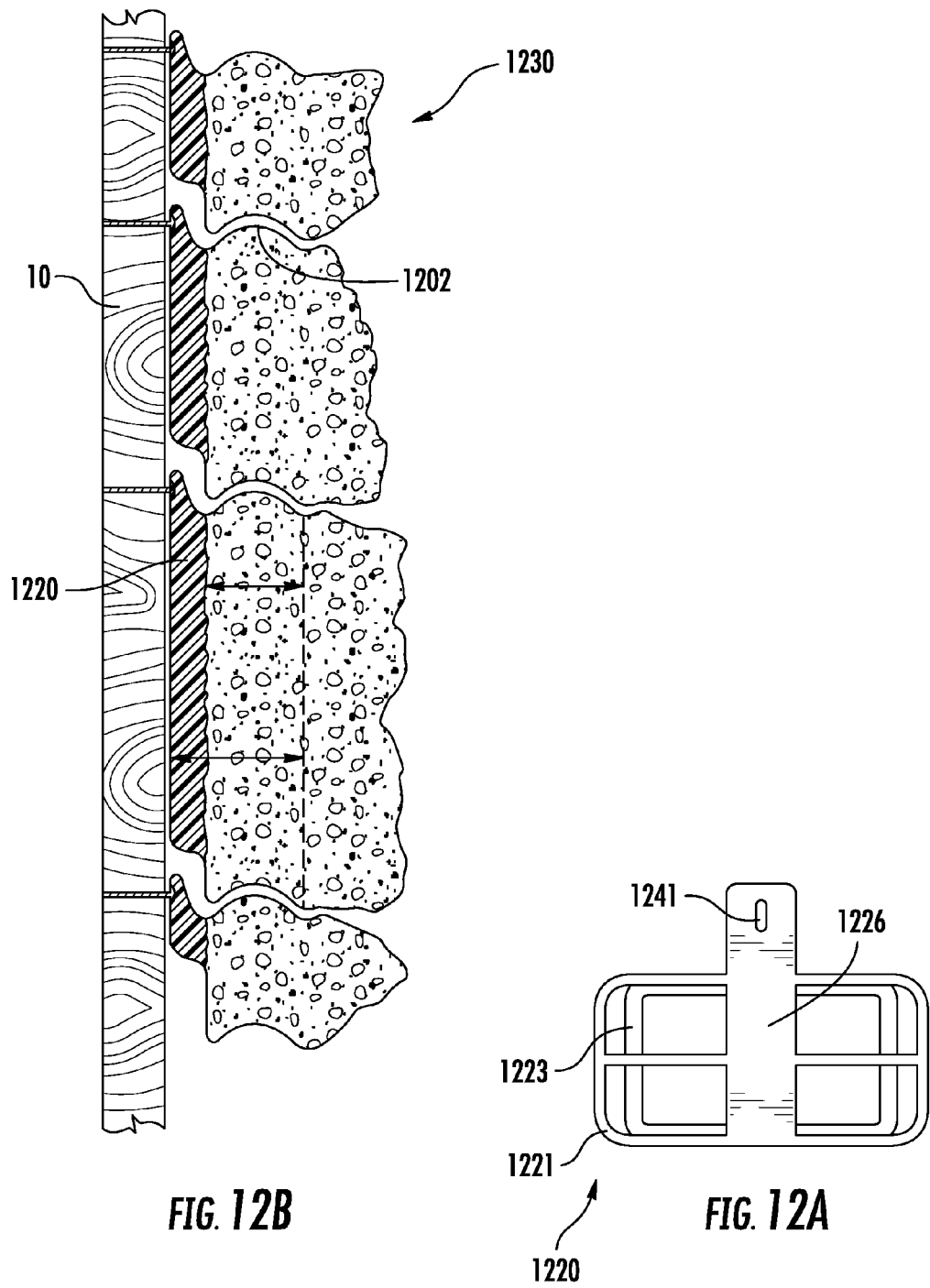
FIGS. 12A and 12B are schematic diagrams of an exemplary suspension rail of the invention (12A) and the rails embedded in panels installed on a wall (12B).

FIGS. 12A and 12B are schematic diagrams of an exemplary suspension rail of the invention (12A) and the rails embedded in panels installed on a wall (12B). As shown in FIG. 12A, the clip 1220 can comprise a first planar member 1221 comprising more voids in its face than material. Here, there is a frame of material 1221 supported by a cross bar type support 1226 joining the upper, lower, and side edges of the frame. On the rear face of the suspension rail, there are perpendicular support posts (not shown) which terminate in a second frame of material 1223 disposed in a plane substantially parallel to the first frame 1221. Optionally, the suspension rail 1220 can comprise one or more voids for receiving a fastener to attach the suspension rail to a wall 1241. As shown in FIG. 12B, the veneer system 1230 can comprise a plurality of panels with embedded suspension rails 1220 attached to a wall 10. When embedded in a panel, the suspension rail 1220 is embedded to a desired depth in the panel. Here, the suspension rail measures ¾ inch between the first and second four-sided frame members and the suspension rail is embedded in the panel up to about ½ inch. In preferred embodiments, the suspension rail is embedded into the panel from about 20-90% of the depth of the suspension rail, such as from 30-80%, or from 40-70%, or from 50-60%. This panel features corresponding rounded edges for providing a bull nose type lock 1202 upon installation of the panels and for providing a panel that is easily removed from the mold during manufacturing. With this type of interaction between panels in an installed system, there is no need for grout as the wall to which the panels are secured will not be viewable.

Figure 13:
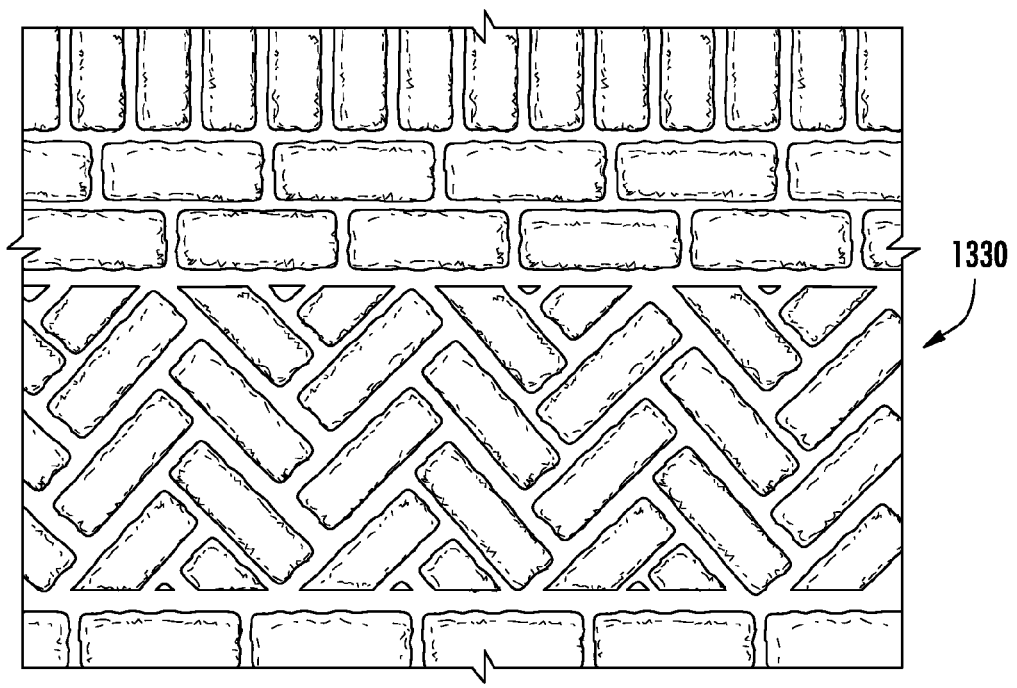
FIG. 13 is a schematic diagram showing a perspective view of a finished facade installed on a wall with brick or brick-like panels and optional mortar between the panels.
Figure 14:
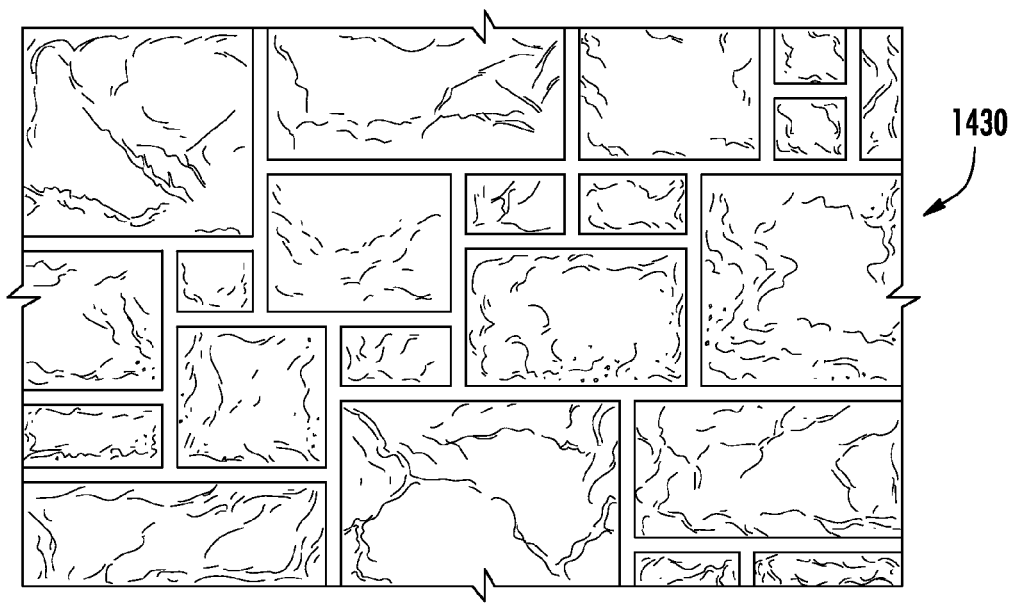
FIG. 14 is a schematic diagram showing a perspective view of a finished facade installed on a wall with stone or stone-like panels and optional mortar between the panels.

FIGS. 13 and 14 are schematic diagrams showing a perspective view of a finished facade 1330 installed on a wall with brick or brick-like panels (FIG. 13) and a finished facade 1430 with stone or stone-like panels (FIG. 14) with optional mortar between the panels.

Figure 15A:
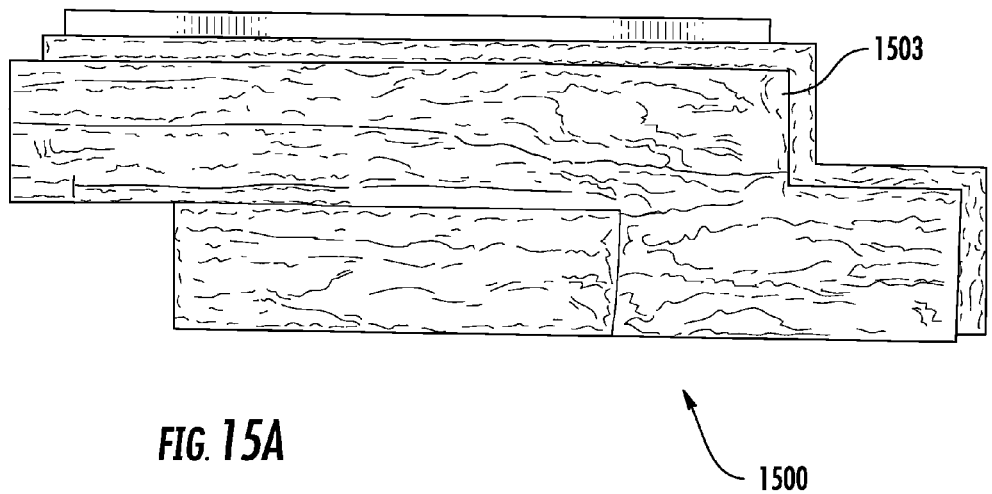
FIGS. 15A and 15B are schematic diagrams of other exemplary panel embodiments of the invention.
Figure 15B:
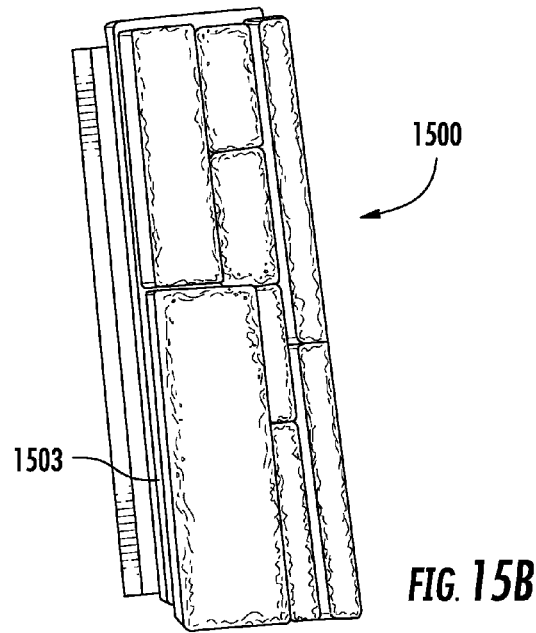

FIGS. 15A and 15B are schematic diagrams of other exemplary panel embodiments of the invention. More particularly, FIG. 15A provides a Z-shaped panel 1530 comprising multiple stacked stones. FIG. 15B is a panel 1530 of multiple stacked stones in an overall block type configuration. An optional feature of panels of the invention and as illustrated in FIGS. 15A-B is that the edges of the panel can comprise a stepped surface 1503 for overlapping with other panels when installed on a wall. The overlap or stepped configuration makes it possible to have a mortarless system since the wall surface will be obstructed from view by the overlapping of the panels. The suspension rails illustrated in this specification can be used with these types of panels as well, or any panel providing a stone, stone-like, brick, brick-like, or multiple stone, multiple brick, multiple stone-like, or multiple brick-like panel. Facade panels of this invention can be configured to resemble and function as the panels disclosed in US Published Patent Application No. 2012-0174516 entitled, "Locking Panel Veneer System," which encompass modular facade panels comprising: (i) a front face for forming part of a first facade, wherein the face is formed as a plurality of stacked stones and has a concave rectilinear polygonal outline configured for mating with adjacent panels when installed in a facade system; (ii) a back side with a suspension rail in communication therewith; and (iii) left and right sides for forming part of another facade in a different plane.

Figure 16B:
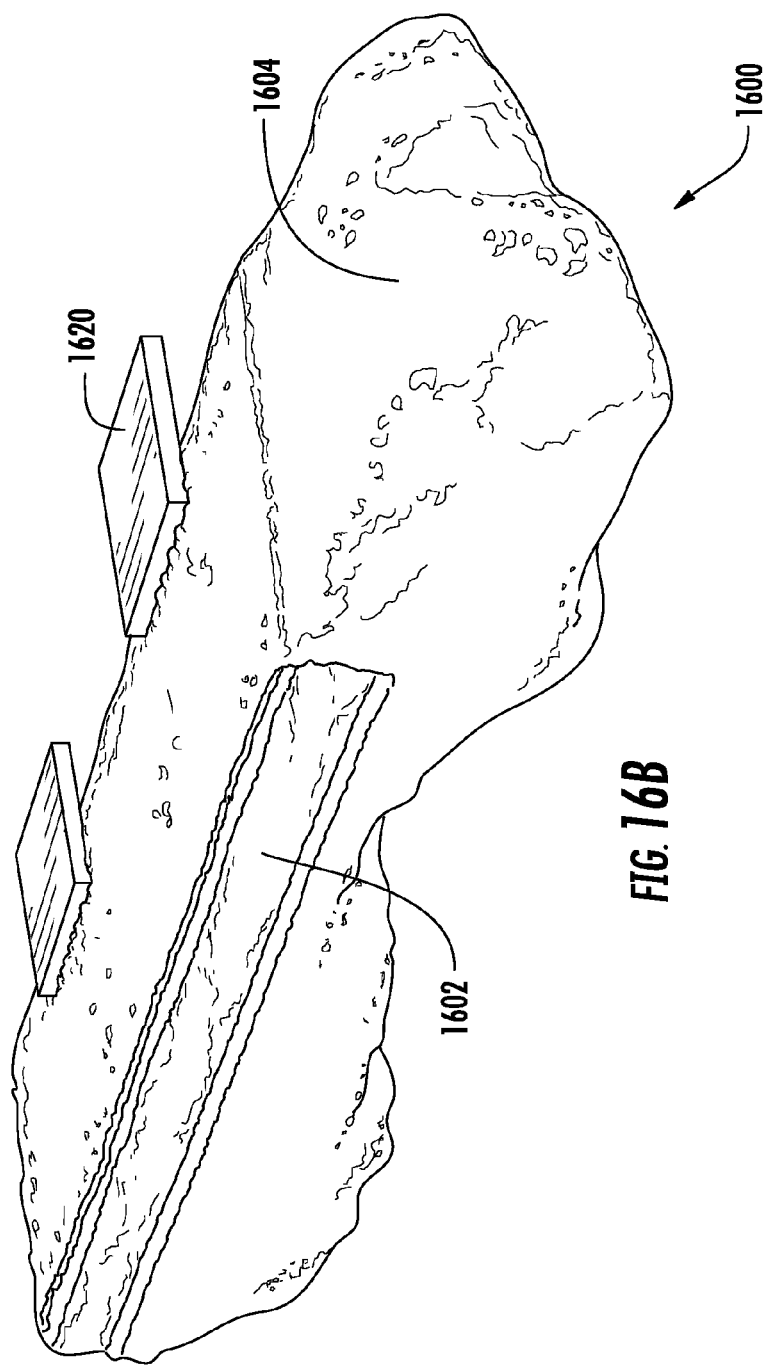

FIGS. 16A-B are schematic diagrams showing a back perspective view (FIG. 16A) and a side perspective view (FIG. 16B) of a panel 1600 embodiment of the invention comprising a corner facade element (panel), two embedded L-shaped clips 1620, and top and bottom panel edges 1602 for interlocking with other panels in a system. This panel embodiment has a specially shaped end 1604, which allows the panel to be installed on a corner surface without revealing that the panel is manufactured as opposed to natural stone. For example, one end of the panel is shaped around all sides of the panel to have a natural stone look. This type of panel is especially useful for covering corner surfaces, such that when installed the end can abut the end of another panel covering an opposing surface at the corner. Since all sides of the ends of the panels are molded to have the look of natural stone, there is no indication at the corner that the panels are manufactured. Corners are usually vulnerable places where a system can be identified as manufactured or synthetic, but with the panels manufactured in this way, the system appears just as a natural stone or brick system would. One way of preparing this type of embedded panel is by using a specially designed mold. For example, a shoe or slipper type mold can be used, which resembles a slipper. Instead of having a completely open upper surface (as shown in FIGS. 10 and 11), a portion of the mold at one end is covered. This covered portion of the mold has texturing on all sides of the mold to provide for a panel having one end textured or molded on all exterior surfaces to resemble brick or stone.

The molds, and consequently the panels, are scalable and can be fabricated in a variety of sizes. Typically the panels have a height between 1 and 24 inches, a length between 1 and 24 inches, and an average width between 0.5 and 4 inches. Preferably, the height and/or length ranges from about 1-16 inches, or from about 2-12 inches, or about 3-10 inches, or about 4-8 inches, such as about 5-6 inches, while the width ranges from ¾ inch to 2 inches. In embodiments, the panels can be configured to comprise a single manufactured stone or brick or a plurality of stones and bricks.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. Where a range of values is provided in this specification, each value between the upper and lower limits of that range is also specifically disclosed. The upper and lower limits of these smaller ranges may independently be included or excluded in the range as well. As used in this specification, the singular forms "a," "an," and "the" include plural referents unless the context clearly dictates otherwise. It is intended that the specification and examples be considered as exemplary in nature and that variations that do not depart from the essence of the invention are intended to be within the scope of the invention. Further, the references cited in this disclosure are incorporated by reference herein in their entireties.

The invention claimed is:

1. A facade system comprising:
   a molded panel with a front face; and
   a first suspension rail partially embedded in a back face of the panel comprising:
   a first four-sided frame with a first planar face and horizontally and vertically disposed sides;
   one or more cross bar joining two or more sides of the first frame;
   a plurality of posts disposed on and perpendicular to a second planar face of the first frame;
   a second four-sided frame in communication with the plurality of posts;
   an upper tab in communication with the first frame for connecting the suspension rail to a surface, wherein the upper tab has a planar face disposed in a stepped configuration relative to the first planar face of the first frame, such that the upper tab extends beyond a perimeter of the front face of the panel such that the upper tab is visible from the front face of the panel.

2. The facade system of claim 1, wherein the tab comprises a spacing indicator.

3. The facade system of claim 1, wherein one or more cross bar is disposed perpendicular to any of the four sides of the first frame.

4. A facade system comprising:
   a molded panel; and
   a suspension rail partially embedded in the panel comprising:
   a first four-sided frame with horizontally and vertically disposed sides;
   one or more cross bar joining two or more sides of the first frame;
   a plurality of posts disposed on and perpendicular to the first frame or the cross bars;
   a second four-sided frame in communication with the plurality of posts;
   an upper tab in communication with the first frame for connecting the rail to a surface;
   wherein one or more cross bar is disposed at an angle less than perpendicular to any of the four sides of the first frame.

5. The facade system of claim 4 comprising cross bars disposed in an X configuration.

6. The facade system of claim 1, wherein one or more cross bar is fortified with a perpendicular support.

7. The facade system of claim 1 further comprising one or more side tabs disposed perpendicular to a vertical side of the first frame and parallel to the plurality of posts.

8. The facade system of claim 1, wherein the four sides of the first frame have a width greater than their thickness and wherein the four sides of the second frame have a thickness greater than their width.

9. The facade system of claim 1, wherein a perimeter of the first frame is larger than a perimeter of the second frame.

10. The facade system of claim 1, wherein the suspension rail is 3-D printed.

11. The facade system of claim 1, wherein the suspension rail has a rippled surface.

12. The facade system of claim 1, wherein the second frame is entirely embedded in the molded panel and wherein the posts are only partially embedded in the molded panel to provide for a gap between the first frame and the molded panel.

13. The facade system of claim 1, wherein the stepped configuration of the upper tab provides a space to accommodate a second suspension rail between the upper tab of the first suspension rail and the surface for connection.

14. The facade system of claim 13, wherein the upper tab and the second suspension rail comprise a plurality of voids configured for alignment of the voids of the second suspension rail with the voids of the upper tab during installation.

15. The facade system of claim 1, wherein the cross bars are coplanar with the horizontally and vertically disposed sides.

16. The facade system of claim 15, further comprising supports projecting perpendicularly from the vertical sides and crossbars.

\* \* \* \* \*